United States Patent [19]

Dorigo

[11] 4,432,450
[45] Feb. 21, 1984

[54] MESH-BELT CONVEYOR FOR INDUSTRIAL FURNACES

[75] Inventor: Oddino Dorigo, Bagnolo Cremasco, Italy

[73] Assignee: Societa' Industriale Bagnolo S.I.B. S.r.l., Bagnolo Cremasco, Italy

[21] Appl. No.: 307,636

[22] Filed: Oct. 1, 1981

[30] Foreign Application Priority Data

Oct. 2, 1980 [IT] Italy .............................. 25093 A/80

[51] Int. Cl.³ ........................................... B65G 23/00
[52] U.S. Cl. .................................... 198/832; 198/859
[58] Field of Search ..................... 198/812, 832, 859

[56] References Cited

U.S. PATENT DOCUMENTS 4,151,906   5/1979   Pfeiffer et al. ................... 198/832

Primary Examiner—Joseph E. Valenza
Assistant Examiner—Jonathan D. Holmes
Attorney, Agent, or Firm—Young & Thompson

[57] ABSTRACT

A mesh-belt conveyor for conveying materials into industrial furnaces comprises a conventional continuous mesh-belt wound at one end around an idle reversing roller and engaged at its other end in a labyrinth device subjected to a reciprocating motion in the general direction of the conveyor, the belt being also intermittently clamped, close to the reversing roller, by a gripping device which produces intermittent movements of the belt toward the reversing roller in alternation with the movements of the labyrinth device, in order to cause an intermittent advance of the belt.

8 Claims, 6 Drawing Figures

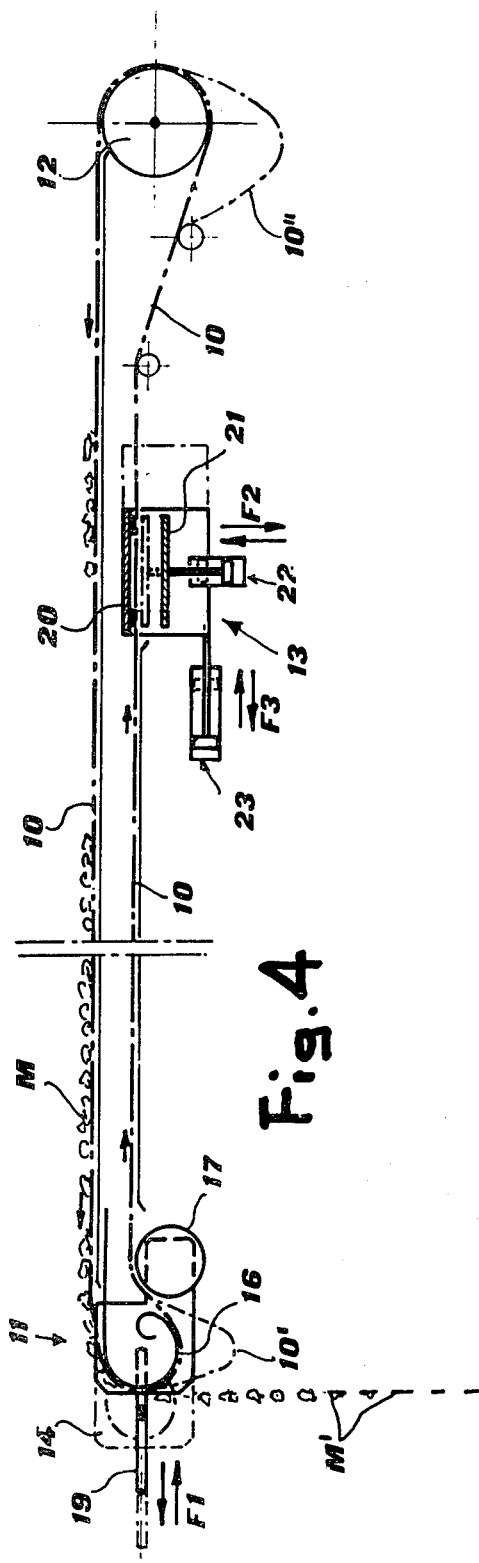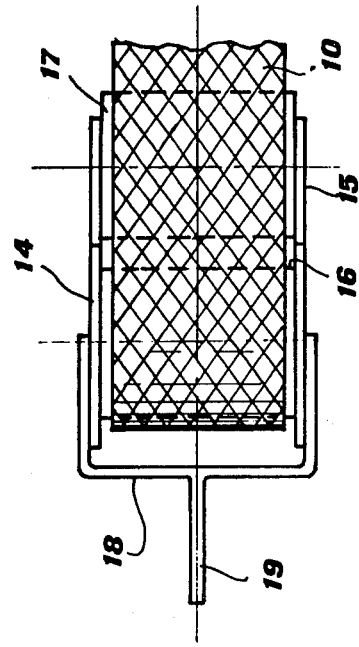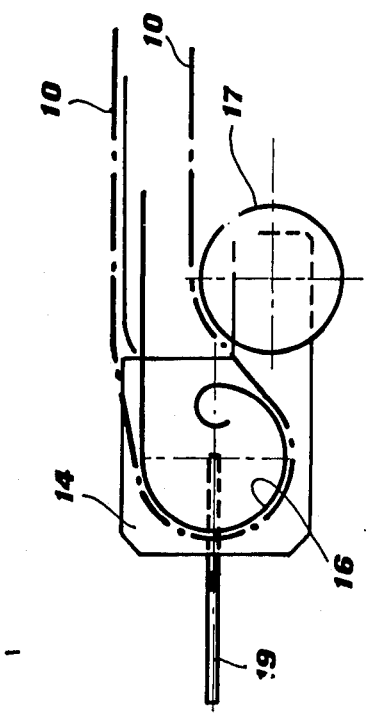

MESH-BELT CONVEYOR FOR INDUSTRIAL FURNACES

BACKGROUND OF THE INVENTION

This invention relates to a mesh-belt conveyor with intermittent advance, particularly for conveying materials in industrial furnaces.

It is known that in modern industrial processes, particularly in mass-production, mechanical means are being increasingly used to convey materials, to guarantee maximum uniformity in production, to reduce unit costs and to use as little manual labour as possible.

When it is required to convey materials at the high temperatures existing inside industrial furnaces, one of the means being increasingly used at present consists of mesh-belt conveyors, which suffer however from serious drawbacks, as will be described in detail hereinafter.

SUMMARY OF THE INVENTION

The invention accordingly provides, for use in the conveyance of materials in industrial furnaces, an intermittently advancing mesh-belt conveyor, of completely novel conception and brilliantly solving all the problems arising in connection with the use of this device in the particular context described.

The mesh-belt conveyor according to the invention is essentially characterized in that a conventional continuous mesh-belt wound at one end around an idle reversing roller, is engaged at its opposite end in a labyrinth device subjected to a reciprocating motion in the general direction of the conveyor and adapted to engage with the belt with a friction varying according to the direction of movement of such device, and is intermittently clamped close to said reversing roller by a gripping device adapted alternately to grip and release the belt return section and to produce intermittent movements of the belt towards the reversing roller in alternation with the movements of the labyrinth device, in order to cause an intermittent advance of the belt thereby forming, alternately in correspondence of the labyrinth device and of the reversing roller, belt loops which are removed by the gripping device and by the labyrinth device respectively, the materials conveyed with the belt being discharged at the same end as the labyrinth device.

Preferably, the labyrinth device comprises a pair of side plates interconnected by shaped transverse rounded members slightly offset from one another, the belt being inserted between said members and partially winding around them, and a drive rod connected by a fork to said plates, means being provided to cause said rod and thus the labyrinth device to perform reciprocating movements in the general direction of the conveyor belt.

The gripping device preferably comprises a pair of side-by-side plates between which slides the belt return section, and means for alternately moving said plates towards and away from one another so as alternately to grip and to release the belt therebetween, as well as means for causing said plate assembly to perform reciprocating movements in the general direction of conveyor.

BRIEF DESCRIPTION OF THE DRAWINGS

The invention will now be described in detail, with reference to a preferred embodiment thereof shown diagrammatically in the accompanying drawings, which also briefly illustrate the prior art and in which:

FIG. 4 is a diagrammatic side view in longitudinal section of the conveyor according to the invention; and FIGS. 5 and 6 are detail views, from the side and the top respectively, of one of the ends of the conveyor shown in FIG. 4.

DESCRIPTION OF THE PREFERRED EMBODIMENT

Figure 1:
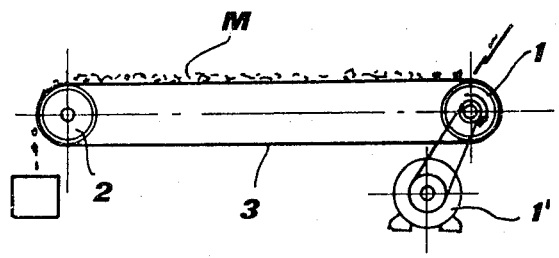
FIG. 1 shows the simplified general structure of a prior art mesh-belt conveyor.
Figure 2:
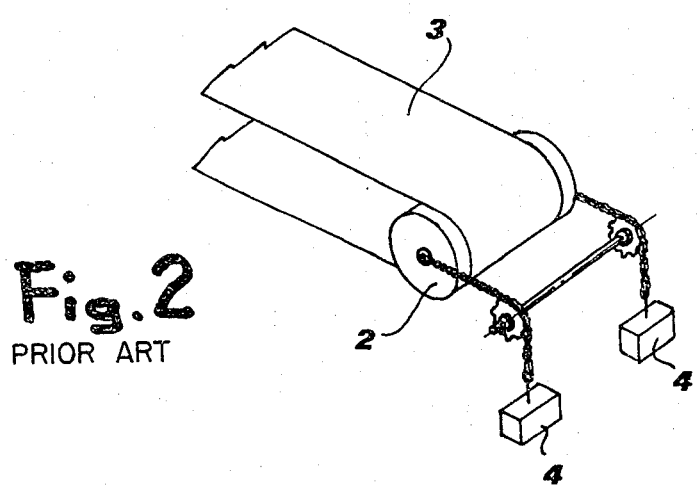
FIG. 2 shows a first way of overcoming the main drawback of the conveyor structure of FIG. 1, when this works in a high-temperature environment.
Figure 3:
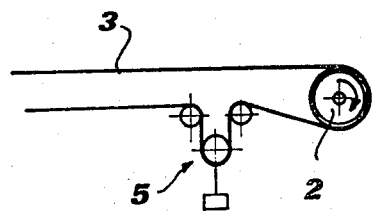
FIG. 3 shows a more elaborate way, than that of FIG. 2, of solving the same problem.

With reference to FIGS. 1 to 3, illustrating the prior art, a conventional mesh-belt conveyor comprises (FIG. 1) a driving roller 1 and a generally idle roller 2 which keep under tension a mesh-belt 3 wound thereon. An electric motor 1', or other suitable mechanism, causes the rotation of the roller 1 and thereby the movement of the belt 3.

The material M to be conveyed can either be placed directly on the belt 3, as shown, or be placed in appropriate containers which are in turn placed on the belt.

This method, very simple at first sight and efficient under normal environmental conditions has instead serious drawbacks, preventing the use thereof, when having to work in high-temperature environments.

It is in fact evident that, in the device of FIG. 1, a certain friction has to be maintained between the driving roller 1 and the belt 3, for this latter to be able to move forward, and that such friction can be easily produced by tensioning the belt to a certain extent. However, even if the initial belt friction may be satisfactory, when the conveyor is in a high-temperature environment the belt itself, being subjected to a gradual elongation due to heat, will soon lack the adhesive force required to move the belt forward.

A simple way of overcoming the above drawback is shown in FIG. 2, wherein the idle roller 2 of the conveyor is continuously moved due to the action of counterweights 4, in order to compensate the elongations of the belt 3 and thus keep such belt under constant tension and therefore constantly adhering to the roller 1, as required to operate the forward movement of said belt.

Another more complex solution to the problem is shown purely by way of example in FIG. 3, wherein the elongation of the belt 3 is taken up directly by a counterweight stretcher 5 which, as in the case of FIG. 2, ensures constant adhesion between the belt and the rollers 1 and 2 (rotating in fixed positions), thereby guaranteeing the advance of the belt even when elongated as a result of heat expansion.

These and other similar solutions may be satisfactory at moderately high temperatures, but become inadequate at high and very high temperatures, such as are found in furnaces for heat treatments of metals and for other uses such as baking, enameling, deoxidation and electronics.

The reason for this shortcoming is that the material—braided or woven wire—used for the belts undergoes, above a critical temperature, a gradual and increasing reduction of its tensile strength, whereby the counterweight method would lead either to a continuous elongation of the belt until this latter becomes unserviceable, or to the belt having to be made of such heavy wire—in order to reduce the specific tensile load—that in practice, at high temperatures, the ratio between passive load (weight of the belt) and active load (weight of the material to be conveyed) would be quite uneconomical.

Manufacturers have therefore been trying for some time to seek alternative solutions allowing the belts to be subjected to the lowest possible tension, but sufficient to ensure its movement. Nevertheless, the requirement to reach a compromise between having to move the belt and having to subject the same to a minimum tensile stress, both in time and intensity, has so far not allowed achieving any satisfactory solutions.

However, the problem has now been solved very satisfactorily and without any drawbacks by the present invention, which provides for a novel device as illustrated in FIGS. 4 to 6 of the accompanying drawings.

Said device comprises, in addition to a continuous conveyor mesh-belt 10, a driving labyrinth 11 at one end of the belt 10, an idle reversing roller 12 at the other end of the belt 10, and a gripping device 13 close to the roller 12.

The labyrinth 11, shown in greater detail in FIGS. 5 and 6 as well as at the left of FIG. 4, comprises two side plates 14 and 15, to which are rigidly connected two transverse rounded members 16 and 17, positioned one beside the other and slightly offset from one another. The assembly is connected by a fork 18 to a drive rod 19, to which can be imparted by any means (rod and crank, cams, pneumatic or hydraulic pistons, electromagnetic systems, and in any other way) reciprocating movements, according to a pre-established law (arrows F1 in FIG. 4), which are of course transmitted to the members 16 and 17.

The belt 10 is inserted between the shaped members 16 and 17 and partially winds around them, as clearly shown in FIGS. 4 and 5, producing a certain friction in its contact with said members. The shape and mutual positioning of the members 16 and 17 are such that the friction between them and the belt 10 varies according to whether the labyrinth 11 moves in one or the other direction indicated by the arrows F1. More exactly, the friction increases when the movement is towards the outside of the device and it decreases when movement is in the opposite direction.

The gripping device 13 comprises a pair of side-by-side plates 20 and 21, between which slides the lower return run of the belt 10, close to the reversing roller 12. A first fluid-pressure operated cylinder-piston unit 22 is adapted to move the plate 21 towards the plate 20, to clamp the belt therebetween, or alternatively to move the plate 21 away from the plate 20 thereby releasing said belt, the movements being indicated by the arrows F2 in FIG. 4. A second fluid-pressure cylinder-piston unit 23 is adapted to impart reciprocating movements to the entire device 13 parallel to the belt 10, as indicated by the arrows F3 in FIG. 4.

The cylinder-piston units 22 and 23 can of course be replaced by any other suitable means allowing production of the two types of movements required for the plate 21 and for the entire device 13, such units being indicated by mere way of example.

A description will now be given of the operation of the heretofore illustrated belt conveyor.

Assuming that the belt 10 has been loaded with material M, the movement of such belt is produced intermittently by the device 11 and by the device 13.

The rod 19 is first of all moved outwardly, so as to cause an advance of the labyrinth 11 and consequently (thanks to the friction acting in such labyrinth) of the belt 10 and of the material M loaded thereon (said advance being towards the left from the position of the labyrinth 11 shown in dashed lines in FIG. 4). Subsequently, the rod 19 is returned to its initial position through a movement in the opposite direction to the previous one, and the labyrinth 11 again takes up the position shown in full lines in FIG. 4. Through this movement however, thanks to the different frictions now existing in the labyrinth 11, a belt loop 10' is formed below member 16, while the material M which was supported by the corresponding belt portion discharges at M'

The gripping device 13 now starts to operate. The cylinder-piston unit 22 acts first by clamping the belt 10 between the plates 20 and 21, moving the second plate towards the first, then the cylinder-piston unit 23 acts to shift the whole device 13 towards the reversing roller 12 to the dashed line position shown in FIG. 4. By this movement, the device 13 applies a pull on the lower return section of the belt 10 towards the reversing roller 12, removing the belt loop 10' of the labyrinth 11 and creating another belt loop 10" below the reversing roller 12. The cylinder-piston unit 22 is then cut out and the cylinder-piston unit 23 moves back the device 13 to the starting position shown in full lines. At this point, the rod 19 can start again to operate, as already explained hereinbefore; because of the movement imparted by said rod to the labyrinth 11, the belt loop 10" disappears and the belt 10 simultaneously advances again with the material M, which gets discharged with the subsequent movement, as already seen.

Consequently, the material, like the belt, is moved forward in a discontinuous but intermittent or rhythmical manner, and the rhythm of said forward movement can be regulated, while also the strokes of the various movements which, in the described devices, the conveyor has to impart to the various members of such devices, can be adjusted according to the various requirements of use. An important consideration is that the heretofore illustrated structure and operation allow the conveyor according to the invention to fully satisfy the requirement of subjecting the mesh-belt conveying the materials M to the least possible stress; said stress occurs in fact only during the short intervals in which the belt is moved forward to convey the materials, and it is not continuous as in the conventional conveyors; furthermore, the stress is limited to the tension required for obtaining the mere advance of the belt with the materials conveyed thereon, no additional tension being required to ensure adhesion between the belt and a driving roller, as in the known conveyors.

The heretofore described and illustrated belt conveyor can of course also comprise modifications or variants of the embodiment shown, though still falling within the scope of the present invention. It is also to be understood that the conveyor according to the invention, though designed and meant for use in high-temperature environments, can also be employed for other uses.

I claim:

1. An endless belt conveyor disposed in an elongated path having at one end an idle reversing roller about which the conveyor is trained and at the other end a labyrinth device through which the endless conveyor is trained, means mounting the labyrinth device for movement toward and away from the reversing roller, the labyrinth device when moving away from the reversing roller exerting greater friction on the endless belt conveyor than when moving toward the reversing roller, the endless belt conveyor having substantial slack when said labyrinth device is nearest said reversing roller, and means for gripping and advancing said slack toward said reversing roller, said labyrinth device and said means for gripping and advancing cooperatively serving to intermittently advance said endless belt conveyor.

2. A conveyor as claimed in claim 1, said labyrinth device having a plurality of portions between which said slack forms upon movement of said labyrinth device toward said reversing roller.

3. A conveyor as claimed in claim 2, said endless belt conveyor having upper and lower runs, said slack appearing in said lower run below said labyrinth device upon movement of said labyrinth device toward said reversing roller, said gripping means shifting said slack from below said labyrinth device to below said reversing roller.

4. A conveyor as claimed in claim 1, in the form of a mesh belt conveyor for use in high temperature environments.

5. A conveyor as claimed in claim 1, said labyrinth device comprising a pair of side plates interconnected by shaped transverse rounded members slightly offset from one another, the endless belt conveyor extending between said members and partially winding around them.

6. A conveyor as claimed in claim 5, and a drive rod connected by a fork to said plates, and means to reciprocate said rod in the general direction of the conveyor belt.

7. A conveyor as claimed in claim 1, in which said gripping device comprises a pair of plates between which slides the endless belt, means for moving said plates toward and away from each other so as respectively to grip and release the belt, and means for causing said plates to reciprocate in the general direction of the conveyor.

8. A conveyor as claimed in claim 7, said means for moving said plates toward and away from each other and for reciprocating said plates comprising fluid pressure operated cylinder-piston units.

* * * * *